United States Patent [19]

Ishikawa et al.

[11] 4,413,045
[45] Nov. 1, 1983

[54] MULTILAYER ELECTROPHOTOGRAPHIC PHOTOSENSITIVE MEMBER COMPRISES DISAZO CHARGE GENERATOR LAYER, HYDRAZONE TRANSPORT LAYER

[75] Inventors: Shozo Ishikawa, Sayama; Kazuharu Katagiri, Mitaka; Katsunori Watanabe, Yamato; Kiyoshi Sakai, Mitaka; Makoto Kitahara, Yokohama, all of Japan

[73] Assignee: Canon Kabushiki Kaisha, Tokyo, Japan

[21] Appl. No.: 381,450

[22] Filed: May 24, 1982

[30] Foreign Application Priority Data

May 26, 1981 [JP] Japan .................. 56-80620

[51] Int. Cl.³ ............................... G03G 5/14
[52] U.S. Cl. ...................... 430/59; 430/73; 430/77
[58] Field of Search .................. 430/59, 58, 73, 77

[56] References Cited

U.S. PATENT DOCUMENTS

| | | |
|---|---|---|
| 3,180,729 | 4/1965 | Klupfel et al. . |
| 3,378,554 | 4/1968 | Pushchel et al. . |
| 3,484,237 | 12/1969 | Shattuck et al. . |
| 3,684,502 | 8/1972 | Gramza et al. . |
| 3,775,105 | 11/1973 | Kukla . |
| 3,775,108 | 11/1973 | Arai et al. . |
| 3,824,099 | 7/1974 | Champ et al. . |
| 3,837,851 | 9/1974 | Shattuck et al. . |
| 3,870,516 | 3/1975 | Smith et al. . |
| 3,871,882 | 3/1975 | Wiedemann . |
| 3,877,935 | 4/1975 | Regensburger et al. . |
| 3,884,691 | 5/1975 | Rochlitz . |
| 3,894,868 | 7/1975 | Regensburger et al. . |
| 4,024,125 | 5/1977 | Kunstmann et al. . |
| 4,122,113 | 10/1978 | Purner . |
| 4,150,987 | 4/1979 | Anderson et al. . |
| 4,251,614 | 2/1981 | Sasaki et al. . |
| 4,256,821 | 3/1981 | Enomoto et al. . |
| 4,260,672 | 4/1981 | Sasaki . |
| 4,265,991 | 5/1981 | Hirai et al. . |
| 4,272,598 | 6/1981 | Sasaki et al. . |
| 4,278,747 | 7/1981 | Murayama et al. . |
| 4,279,981 | 7/1981 | Ohta, et al. . |
| 4,297,426 | 10/1981 | Sakai et al. . |
| 4,321,318 | 3/1982 | Anderson et al. .............. 430/59 |

FOREIGN PATENT DOCUMENTS

| | | |
|---|---|---|
| 930988 | 7/1963 | United Kingdom . |
| 1030024 | 5/1966 | United Kingdom . |
| 1296390 | 11/1972 | United Kingdom . |
| 1370197 | 10/1976 | United Kingdom . |
| 1453024 | 10/1976 | United Kingdom . |
| 1465141 | 2/1977 | United Kingdom . |
| 1465142 | 2/1977 | United Kingdom . |
| 2001769A | 2/1979 | United Kingdom . |
| 2018446A | 10/1979 | United Kingdom . |
| 2034493A | 6/1980 | United Kingdom . |
| 2052082A | 1/1981 | United Kingdom . |
| 2055803A | 3/1981 | United Kingdom . |
| 2034494A | 6/1982 | United Kingdom . |

Primary Examiner—John D. Welsh
Attorney, Agent, or Firm—Fitzpatrick, Cella, Harper & Scinto

[57] ABSTRACT

An electrophotographic photosensitive member is characterized by comprising a charge generation layer containing at least one disazo pigment represented by the following formula [I] and a charge transport layer containing at least one hydrazone compound represented by the following formula [II]:

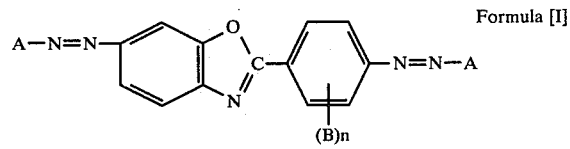

Formula [I]

wherein A is a coupler residue, B represents hydrogen, halogen, alkyl, or alkoxy, and n is an integer of 1 to 4;

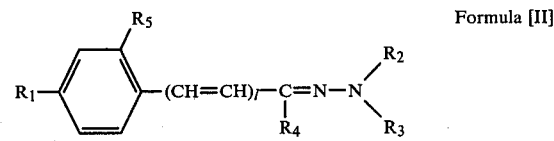

Formula [II]

wherein $R_1$ represents N,N-dialkyl amino, or N,N-diarylamino, or N-alkyl-N-arylamino, or alkoxy or aryloxy, each being substituted or unsubstituted; $R_2$ and $R_3$ each represent alkyl, aralkyl, or aryl, each being substituted or unsubstituted, or $R_2$ and $R_3$, together with the nitrogen atom which links them, represent nitrogen-containing heterocyclic ring; $R_4$ represents hydrogen, or alkyl, aralkyl, or aryl, each being substituted or unsubstituted; $R_5$ represents hydrogen, alkyl, or alkoxy; and $l$ is 0 or 1.

7 Claims, No Drawings

MULTILAYER ELECTROPHOTOGRAPHIC PHOTOSENSITIVE MEMBER COMPRISES DISAZO CHARGE GENERATOR LAYER, HYDRAZONE TRANSPORT LAYER

BACKGROUND OF THE INVENTION

1. Field of the Invention

The present invention relates to a type of electrophotographic photosensitive member wherein its functions are allotted to a charge generation layer and a charge transport layer. More particularly, it relates to an electrophotographic photosensitive member containing a specific disazo pigment in its charge generation layer as well as a specific hydrazone compound in its charge transport layer.

2. Description of the Prior Art

There have so far been known selenium, cadminum sulfide, zinc oxide, etc. as photoconductive materials for use in electrophotographic photosensitive members. In contrast to the many advantages thereof, such as, for instance, chargeability in the dark to a suitable potential, small dissipation of charge in the dark, and fast dissipation ability by light irradiation, these photoconductive materials have the disadvantages of lacking film forming property per se with very few exceptions such as amorphous selenium and of poor ability to retain a charge applied to their surface.

On the other hand, a variety of organic photoconductive materials are known, including photoconductive polymers such as polyvinylcarbazole and polyvinylanthracene.

There are also known low-molecular organic photoconductors such as pyrazoline compounds disclosed in British Pat. No. 1030024 and U.S. Pat. No. 3,180,729 and styryl compounds disclosed in British Pat. Nos. 1465141 and 1465142.

However, these organic photoconductive materials cannot be said to be useful in practice since they generally have neither enough sensitivity nor sufficient film forming property in actual use.

Also, although these low-molecular organic photoconductors have solved the problem of film forming property, which has been an objection to the application of the above organic photoconductive polymers, by their selection of a suitable binder, there are still many difficulties in their practical applications because of their low sensitivity.

In view of the above, a photosensitive member of a laminated structure has been recently proposed which comprises two photosensitive layers, a charge generation layer and a charge transport layer, having allotted functions. The electrophotographic photosensitive member having such photosensitive layers in a laminate structure has been improved in sensitivity to visible light, in charge retentivity, and in surface strength.

Such photosensitive members are disclosed in U.S. Pat. Nos. 3484237, 3837851, and 3871882 and British Pat. No. 1453024.

It has been known that the following substances can be incorporated into the charge generation layer of the above-mentioned electrophotographic photosensitive member having a laminate structure comprising photosensitive layers for charge generation and charge transport which have those respective allotted functions: inorganic substances such as selenium, selenium-tellurium, selenium-arsenic, cadmium sulfide, and amorphous silicon and organic substances such as pyrylium dyes, thiopyrylium dyes, triarylmethane dyes, thiazine dyes, cyanine dyes, phthalocyanine pigments, perylene pigments, indigo pigments, thioindigo pigments, quinacridone pigments, squaric acid pigments, azo pigments, polycylic quinone pigments, etc.

For example, disazo pigments having a skeleton of 2-phenyl-benzoxazole have been proposed as a charge-generating material for use in a charge generation layer (Ishikawa et. al., U.S. Pat. Ser. No. 235,793 filed Feb. 19, 1981; Takasu et al., Japanese Patent Application No. 178532/1980).

For the charge transport layer, it has been disclosed to incorporate thereinto pyrene, N-ethylcarbazole, N-isopropylcarbazole, 2,5-bis(p-diethylaminophenyl)-1,3,4-oxadiazole, pyrazoline compounds such as 1-phenyl-3-(p-diethylaminostyryl)-5-(p-diethylaminophenyl)-pyrazoline, hydrazone compounds such as p-diethylaminobenzaldehyde-N,N-diphenylhydrazone, oxazole compounds such as 2-(p-diethylaminostyryl)-6-diethylaminobenzoxazole, triphenylamine, poly(N-vinylcarbazole), halogenated poly(N-vinylcarbazole), polyvinylpyrene, polyvinylanthracene, polyvinylacridine, poly(α-vinylphexylanthracene), pyrene-formaldehyde resin, ethylcarbazole-aldehyde resin, etc.

However, satisfactory sensitivity or durability has not yet been obtained with electrophotographic photosensitive members having any of the above-noted compounds in each photosensitive layer. In photosensitive members of the present type, their sensitivity and endurance characteristics vary depending upon combinations of charge-generating and charge-transporting materials used in the charge generation and charge transport layers, respectively. Although a general method is known to select a charge-transporting material taking its ionization potential into consideration as a measure for evaluating it, in practice, combinations of charge-generating and charge-transporting materials are now selected only after repetition of a great number of experiments. Additionally, the photosensitive members of the laminate type have a relatively large photomemory effect as compared with photosensitive members having inorganic photoconductors. This is also a problem which seeks a solution.

SUMMARY OF THE INVENTION

An object of this invention is to provide an electrophotographic photosensitive member having a high sensitivity and good endurance characteristics.

Another object of this invention is to provide an electrophotographic photosensitive member having an improved photomemory effect.

The objects of the invention are attainable in an electrophotographic photosensitive member comprising a charge generation layer containing at least one disazo pigment represented by the following formula [I] and a charge transport layer containing at least one hydrazone compound represented by the following formula [II]:

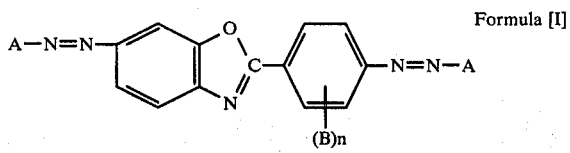

Formula [I]

wherein A is a coupler residue, B is hydrogen, halogen, alkyl, or alkoxy, and n is an integer of 1 to 4, with the proviso that atoms or groups represented by B, when n is 2, 3, or 4, may be either the same or different.

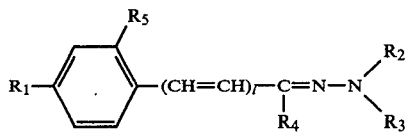

Formula [II]

wherein $R_1$ represents N,N-dialkyl amino, or N,N-diarylamino, or N-alkyl-N-arylamino, or alkoxy or aryloxy, each being substituted or unsubstituted; $R_2$ and $R_3$ each represent alkyl, aralkyl, or aryl, each being substituted or unsubstituted, or $R_2$ and $R_3$, together with the nitrogen atom which links them, represent nitrogen-containing heterocyclic ring; $R_4$ represents hydrogen, or alkyl, aralkyl, or aryl, each being substituted or unsubstituted; $R_5$ represents hydrogen, alkyl, or alkoxy; and l is 0 or 1.

DETAILED DESCRIPTION OF PREFERRED EMBODIMENTS

Disazo pigments used in this invention are represented by the formula (I),

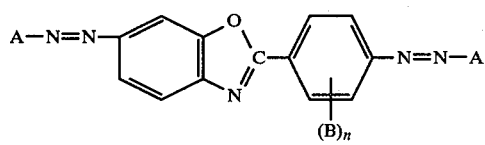

wherein A is a coupler residue which is preferably represented by the following formula (a), (b), (c), or (d):

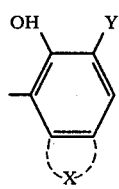

Formula (a)

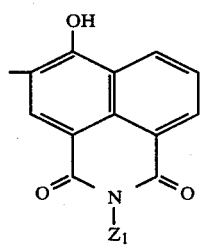

Formula (b)

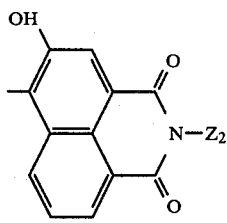

Formula (c)

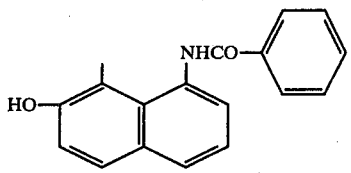

Formula (d)

In formula (a); X represents a group necessary to complete an aromatic ring such as a benzene ring or a naphthalene ring or a heterocyclic ring such as an indole ring a, benzofuran ring, or a carbazole ring, each being substituted or unsubstituted; Y represents

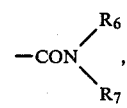

wherein $R_6$ is hydrogen, or alkyl or aryl, each being substituted or unsubstituted and $R_7$ is alkyl or aryl, each being substituted or unsubstituted; said alkyl includes, for example, methyl, ethyl, propyl, butyl, and octyl and said aryl includes, for example, phenyl, tolyl, xylyl, biphenyl, and naphthyl; substitutents on said $R_6$ or $R_7$ include, for example, alkyls such as methyl and ethyl, halogens such as fluorine, chlorine, and bromine, alkoxys such as methoxy and ethoxy, acyls such as acetyl and benzoyl, alkylthios such as methylthio and ethylthio, arylthios such as phenylthio, aryls such as phenyl, aralkyls such as benzyl, nitro, cyano, and alkylaminos such as dimethylamino and diethylamino.

In formulae (b) and (c), $Z_1$ and $Z_2$ each represent alkyl or aryl, each being substituted or unsubstituted, including, for example, alkyls such as methyl, ethyl, propyl, butyl, and amyl; hydroxyalkyls such as hydroxymethyl and hydroxyethyl; alkoxyalkyls such as methoxymethyl, ethoxymethyl, and ethoxyethyl; cyanoalkyls; aminoalkyls; N-alkylaminoalkyls; N,N-dialkylaminoalkyls; haloalkyls; aralkyls such as benzyl and phenethyl; aryls such as phenyl, naphthyl; and substituted phenyls of which substituents are the same as $R_6$ and $R_7$ of formula (a).

In formula (I), B represents hydrogen, halogen (e.g., fluorine, chlorine, or bromine), alkyl (e.g., methyl, ethyl, propyl, butyl, or octyl), or alkoxy (e.g., methoxy, ethoxy, propoxy, or butoxy); n is an integer of 1 to 4; with the proviso that atoms or groups represented by B, when n is 2, 3, or 4, may be either the same or different.

Hydrazone compounds contained in the charge transport layer used in this invention are represented by the formula

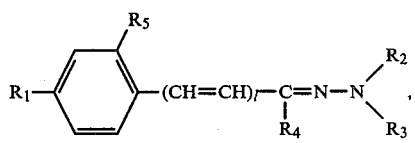

(II)

wherein $R_1$ represents di-substituted amino including substituted or unsubstituted N,N-dialkylamino groups; e.g., N,N-dimethylamino, N,N-diethylamino, N,N-dipropylamino, N,N-dibutylamino, N,N-dioctylamino, N,N-dibenzylamino, N-methyl-N-benzylamino, N-ethyl-N-benzylamino, N-propyl-N-benzylamino, N,N-di-(4-chlorobenzyl)amino, N,N-di-(4-methoxybenzyl- )amino, N,N-di-(2-β-naphthylethyl)amino, and N,N-di-(2-α-naphthylethyl) amino; substituted or unsubstituted N,N-diarylaminos, e.g., N,N-diphenylamino, N,N-di-α-naphthylamino, N,N-di-(4-methylphenyl)amino, and N,N-di-(4-chlorophenyl)amino; and substituted or unsubstituted N-alkyl-N-arylaminos, e.g., N-methyl-N-phenylamino, N-ethyl-N-phenylamino, N-benzyl-N-phenylamino, N-benzyl-N-(4-methoxyphenyl)amino, and N-benzyl-N-(2-methylphenyl)amino; or represents substituted or unsubstituted alkoxy, e.g., methoxy, ethoxy, propoxy, butoxy, octoxy, 2-methoxyethoxy, 2-phenoxymethoxy, 2-chloroethoxy, or 2-phenylethoxy; or substituted or unsubstituted aryloxy, e.g., phenoxy, methylphenoxy, dimethylphenoxy, dibutylphenoxy, chlorophenoxy, 2-chloro-4-octylphenoxy, or 2-chloro-4-acetylphenoxy.

In formula (II), $R_2$ and $R_3$ each represent substituted or unsubstituted alkyl, e.g., methyl, ethyl, n-propyl, n-butyl, t-butyl, n-amyl, t-amyl, n-octyl, or t-octyl; substituted or unsubstituted aralkyl, e.g., benzyl, chlorobenzyl, dichlorobenzyl, methylbenzyl, methoxybenzyl, phenethyl, 3-phenylpropyl, α-naphthylmethyl, or β-naphthylmethyl; substituted or unsubstituted aryl, e.g., phenyl, tolyl, xylyl, biphenyl, chlorophenyl, dichlorophenyl, trichlorophenyl, bromophenyl, dibromophenyl, tribromophenyl, methoxyphenyl, phenoxyphenyl, acetylphenyl, or benzoylphenyl. $R_2$ and $R_3$, together with the nitrogen atom which links them, may also form a nitrogen-containing heterocyclic ring, e.g., a carbazole ring or a phenothiazine ring.

$R_4$ in formula (II) represents hydrogen; substituted or unsubstituted alkyl, e.g., methyl, ethyl, n-propyl, n-butyl, t-butyl, n-amyl, t-amyl, n-octyl, or t-octyl; substituted or unsubstituted aralkyl, e.g., benzyl, chlorobenzyl, dichlorobenzyl, methylbenzyl, methoxybenzyl, phenethyl, 3-phenylpropyl, α-naphthylmethyl, or β-naphthylmethyl; or substituted or unsubstituted aryl, e.g., phenyl, tolyl, xylyl, biphenyl, chlorophenyl, dichlorophenyl, trichlorophenyl, bromophenyl, dibromophenyl, tribromophenyl, methoxyphenyl, phenoxyphenyl, acetylphenyl, benzoylphenyl, α-naphtyl, or β-naphthyl.

Further, $R_5$ represents hydrogen; alkoxy, e.g., methoxy, ethoxy, propoxy, or butoxy; or alkyl, e.g., methyl, ethyl, propyl, butyl, hexyl, or octyl; and l is 0 or 1.

Examples of disazo pigments represented by formula [I] are listed as follows:

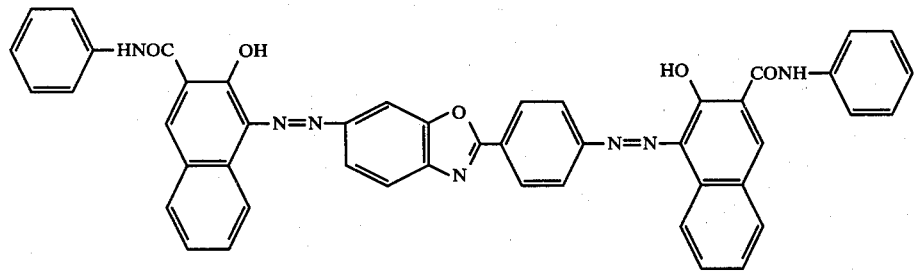

A - (1)

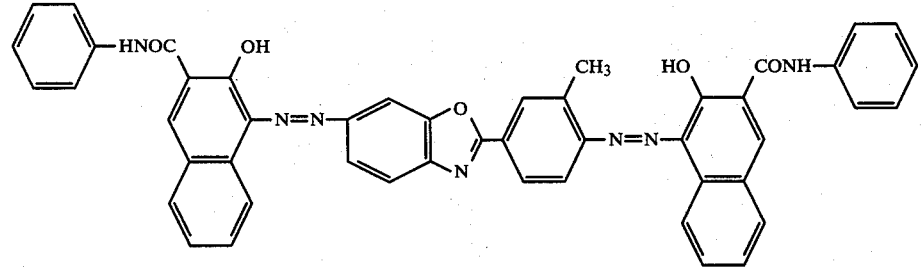

A - (2)

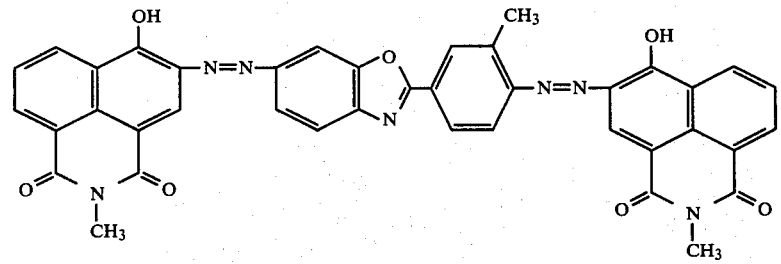

A - (3)

-continued
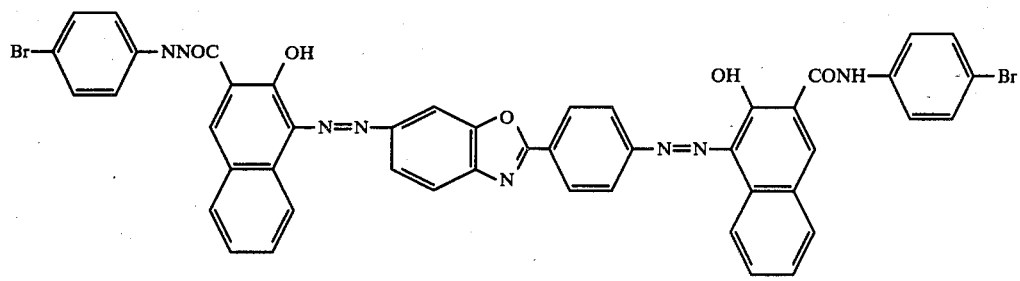
A-(4)
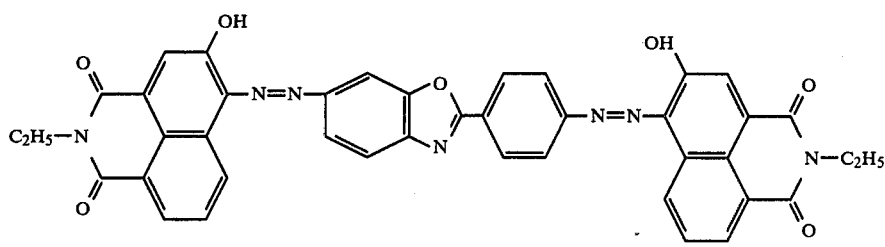
A-(5)
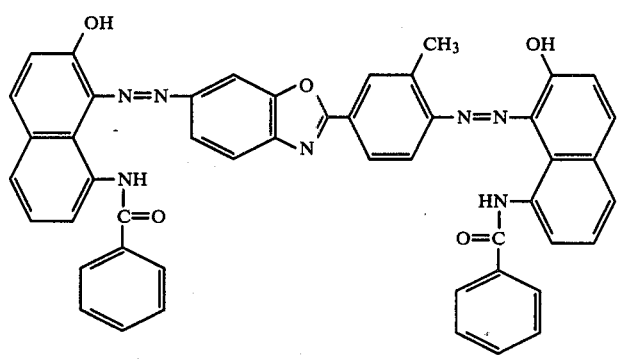
A-(6)
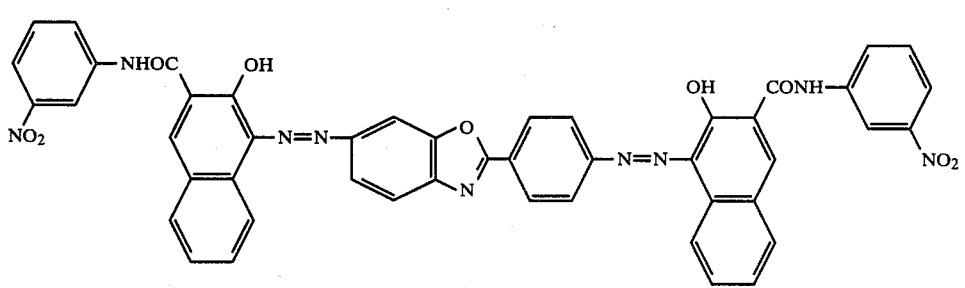
A-(7)
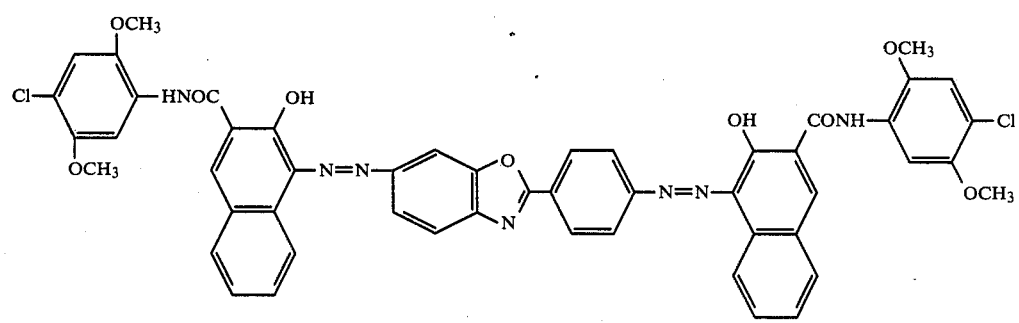
A-(8)

-continued
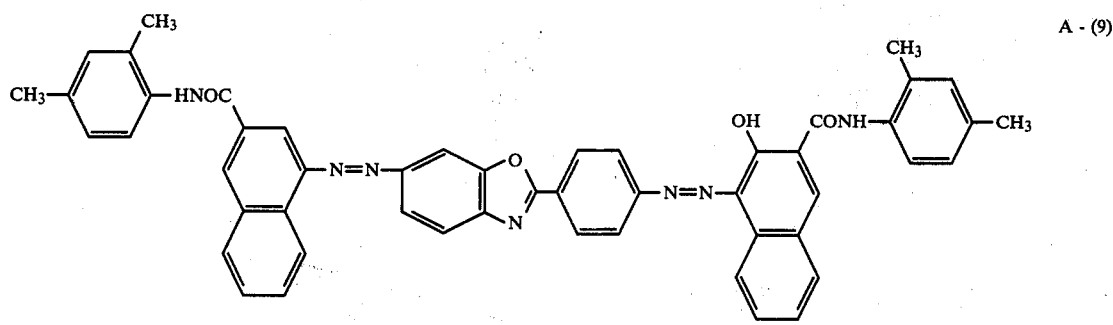
A-(9)
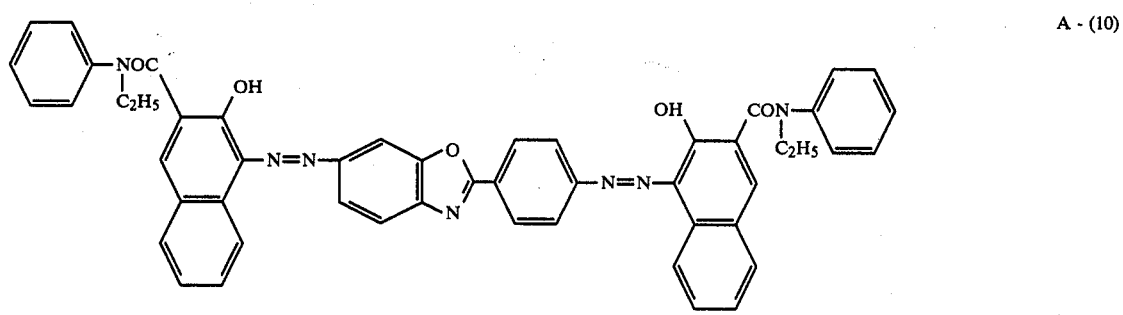
A-(10)
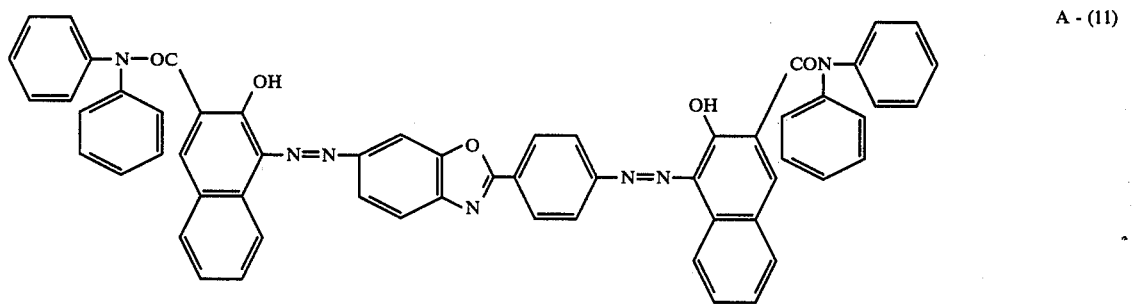
A-(11)
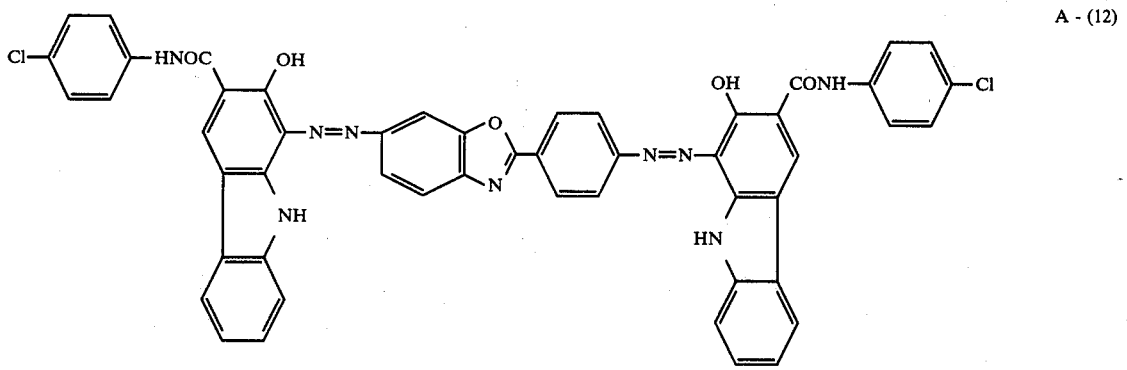
A-(12)

-continued
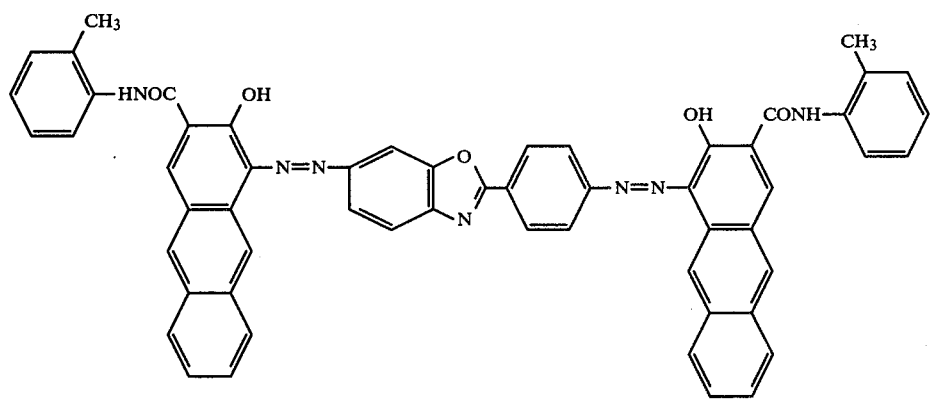
A - (13)
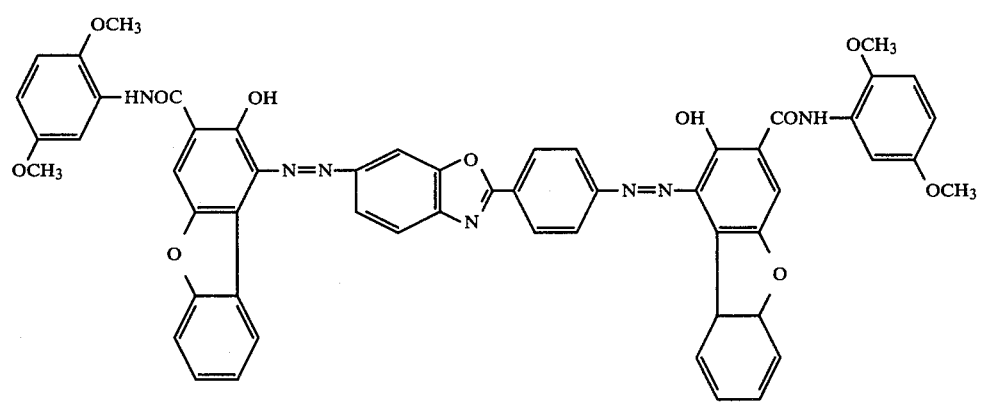
A - (14)
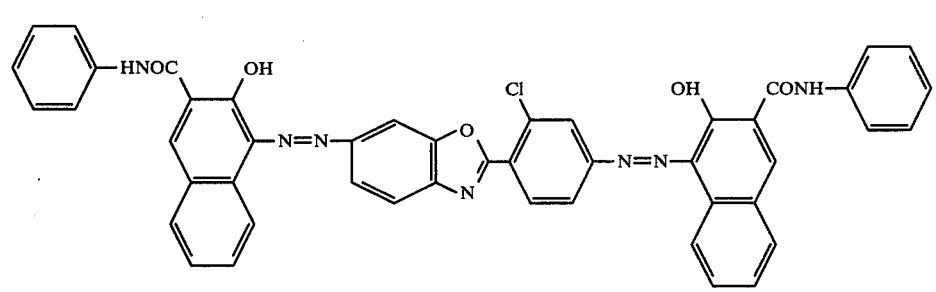
A - (15)
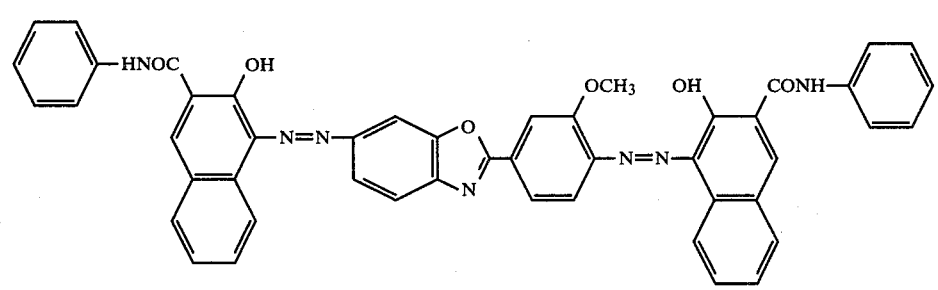
A - (16)

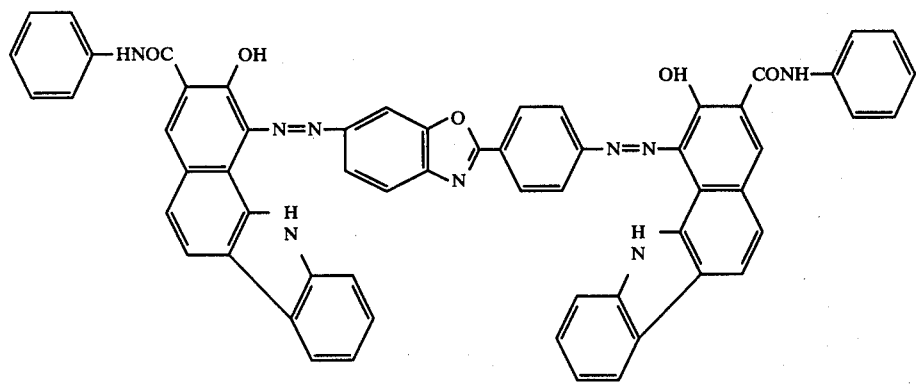
A - (17)
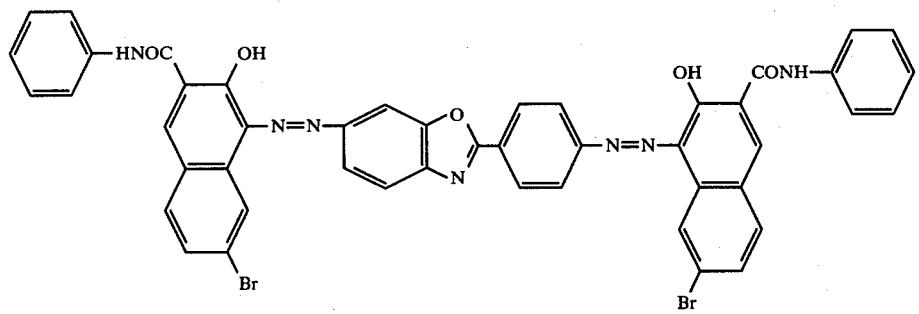
A - (18)
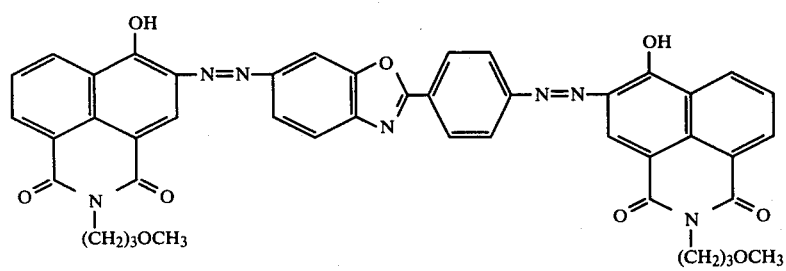
A - (19)
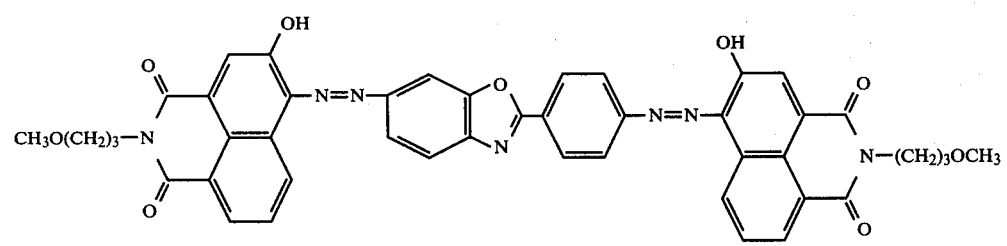
A - (20)
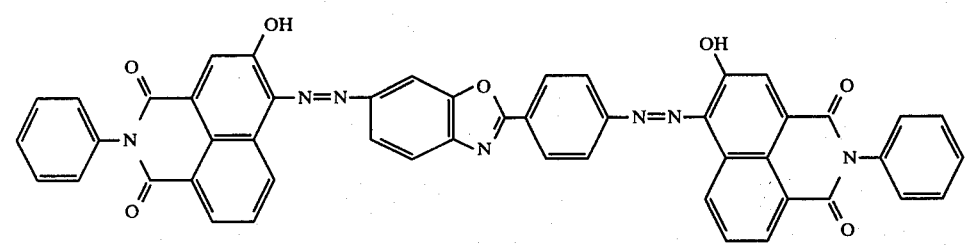
A - (21)

-continued
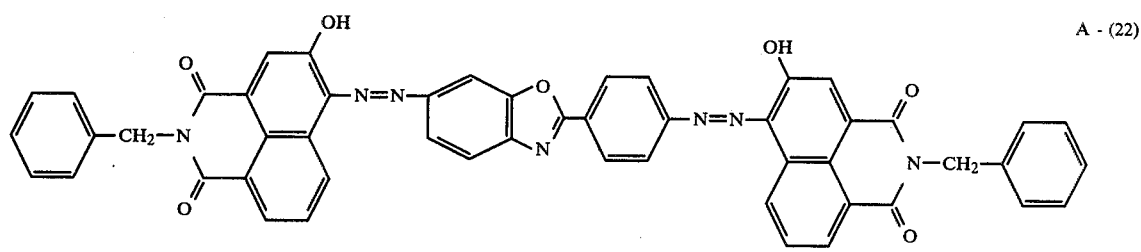 A - (22)
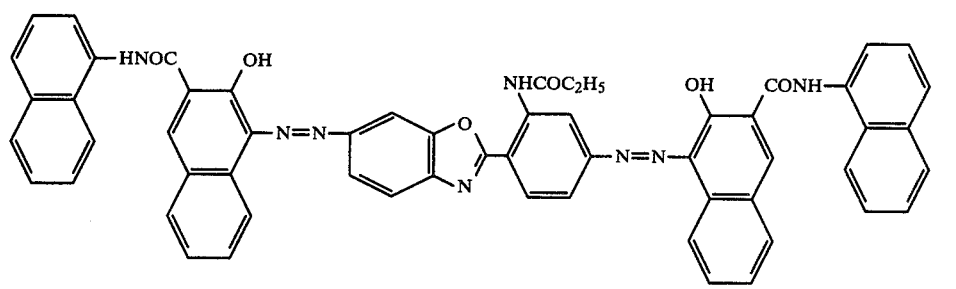 A - (23)
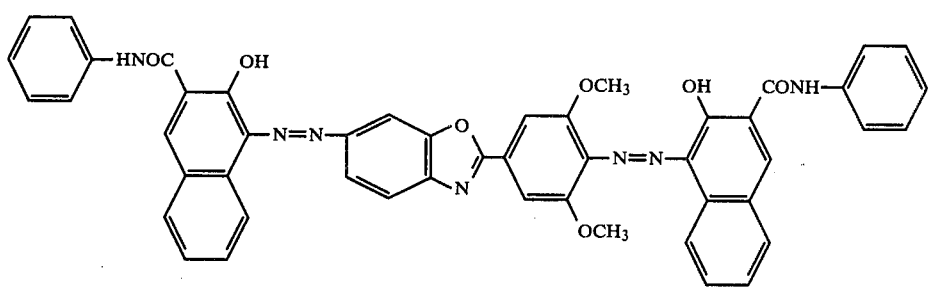 A - (24)
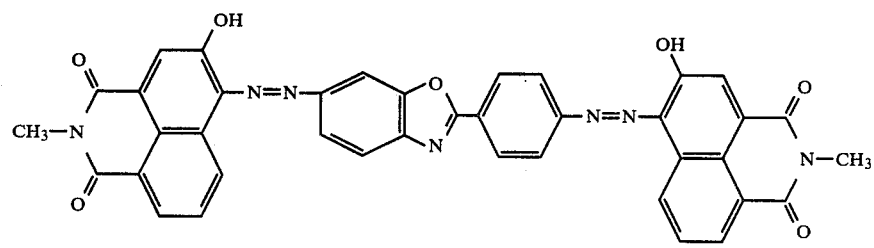 A - (25)
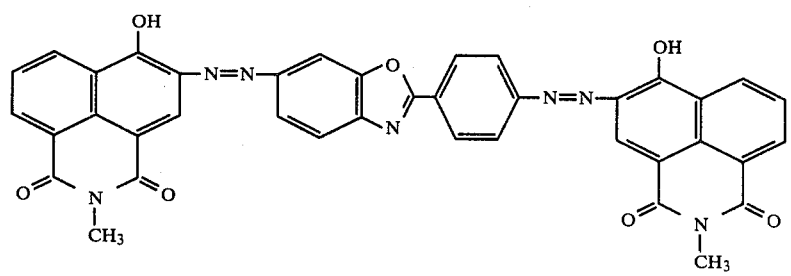 A - (26)

These disazo pigments can be obtained by the synthetic methods described in U.S. patent Ser. Nos. 235,793 (Ishikawa et al., filed Feb. 19, 1981) and 304,564 (Ishikawa et al., filed Sept. 22, 1981).

Examples of hydrazone compounds represented by formula [II] are listed as follows:

-continued
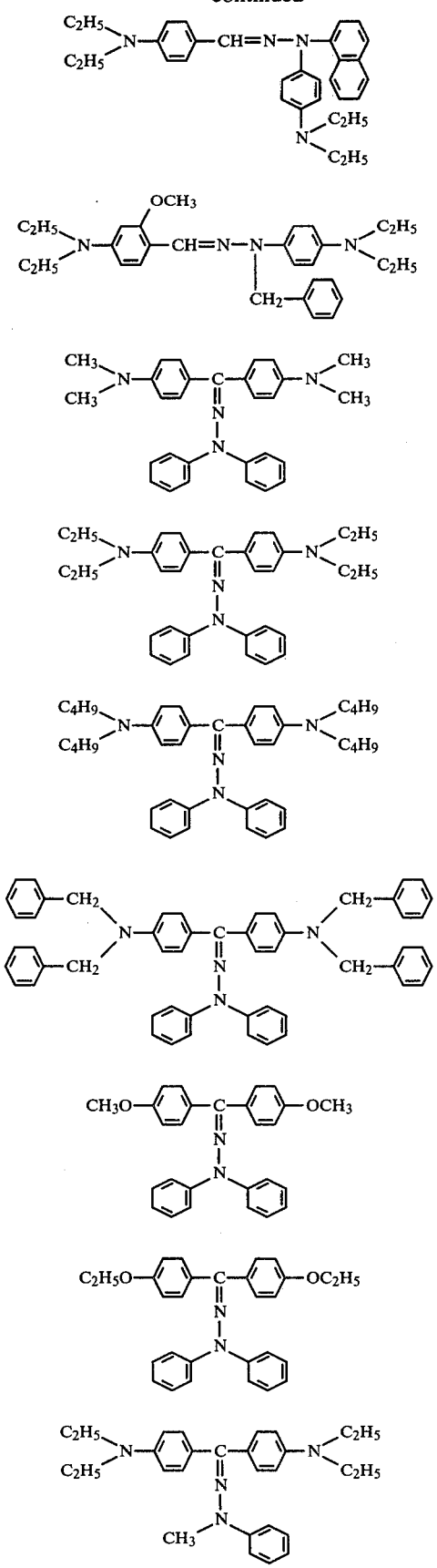
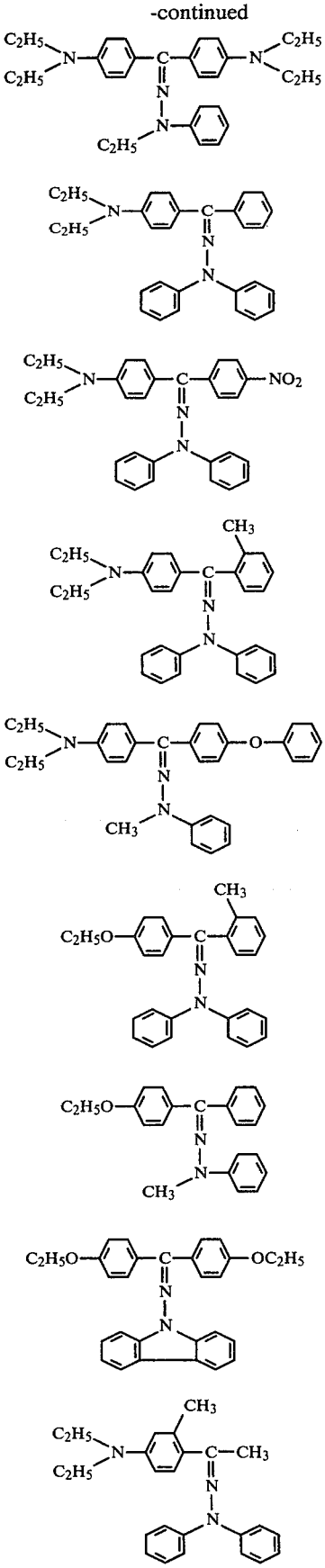

-continued

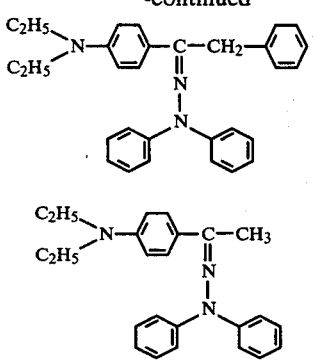
B-(35)

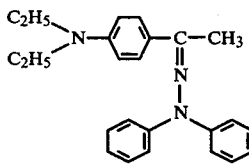
B-(36)

These hydrazone compounds have been disclosed in, for example, U.S. Pat. Nos. 4,150,987 and 4,278,747, Japanese Patent Kokai Nos. 52064 (1980) and 157551 (1980), and U.S. patent Ser. No. 299,575 (Sept. 4, 1981). More specifically, they can be prepared by condensation reactions of aldehyde or ketone compounds with hydrazine compounds in a solvent, e.g., methanol, ethanol, 1,4-dioxane, tetrahydrofuran, ethylene glycol monomethyl ether, ethylene glycol monoethyl ether, or N,N-dimethylformamide. These condensation reactions are preferably carried out in the presence of an acid catalyst, e.g., acetic acid, hydrochloric acid, or dilute sulfuric acid.

It is essential that the electrophotographic photosensitive member of this invention comprises a conductive layer, charge generation layer, and charge transport layer. While the charge generation layer may be laid either on the upper or lower side of the charge transport layer, one type of photosensitive member for repeated use is preferred to have a laminate in order of a conductive layer, charge generation layer, and charge transport layer from bottom to top that construction is preferred in view of the mechanical strength and occasionally of the chargeability of that member.

Hereinafter, this invention will be described referring to electrophotographic photosensitive members of this layer construction.

For the conductive layer, any type of conventional material may be used provided that it is rendered conductive.

A bond layer may be laid between the conductive layer and the charge generation layer as necessary for the purpose of improving the adhesion. Materials for use as the bond layer include various conventional binders such as casein. Suitable thickness of the bond layer is 0.1 to 5μ, preferably 0.5 to 3μ.

The charge generation layer is prepared by coating and drying a dispersion of finely divided disazo pigment of formula [I] in a suitable solvent in which a binder is dissolved, if necessary. For dispersing said disazo pigment, known means such as ball mills and attritors can be used. Particle sizes of the pigment are reduced to 5μ or less, preferably 2μ or less, and most preferably 0.5μ or less. Disazo pigments for this purpose can also be coated after dissolved in an amine solvent such as ethylenediamine and the like. The coating can be carried out by usual methods such as blade coating, Meyer bar coating, spray coating, dip coating, etc. Suitable thickness of the charge generation layer is up to 5μ, preferably 0.01 to 1μ.

The binder content in the charge generation layer should not exceed 80% by weight because the excess content adversely affects the sensitivity. The content is preferably up to 50% by weight, most preferably up to 40% by weight. The binders usable include various types of resins such as poly(vinyl butyral), poly(vinyl acetate), polyesters, polycarbonates, phenoxy resins, acrylic resins, polyacrylamide, polyamides, polyvinylpyridine, cellulosic resin, urethane resins, epoxy resins, casein, poly(vinyl alcohol), and the like.

The surface of the charge generation layer may be mirror-finished if necessary for the purpose of making the injection of carriers from the charge generation layer into the upper charge transport layer, uniform.

The charge generation layer thus formed is overlaid with the charge transport layer. The charge-transporting material hydrazone compound, because it lacks film-forming property, is dissolved in a suitable organic solvent along with a binder, and the resulting solution is coated and dried in the usual way to form the charge transport layer. Thickness of the charge transport layer is 5 to 30μ, preferably 8 to 20μ.

Binders usable in the charge transport layer include acrylic resins, polystyrene, polyesters, polycarbonates, polysulfone, etc. Hole-transporting polymers such as poly(N-vinylcarbazole) can also be used as the binder.

The photosensitive members having layers laminated in successive order of conduction layer, charge generation layer, and charge transport layer, on image exposure after negative charging, produce holes in the exposed areas of the charge generation layer. These holes are injected into the charge transport layer, arrive at the surface of the charge transport layer, and neutralize negative charges to reduce the surface potential, resulting in an electrostatic contrast to the non-exposed areas. The electrostatic latent image thus produced, on developing with a positive toner, yields a visible image, which can be fixed either directly or after being transferred to paper, plastic film, or the like. It is also possible to transfer the electrostatic latent image from the photosensitive member onto the insulating surface of transfer paper and then to develop and fix the transferred image. The developing agent or process is not particularly limited, and any of known ones are applicable.

The electrophotographic photosensitive member of this invention can be used not only for electrophotographic copying machines but also over a wide field of electrophotographic applications such as in laser printers, CRT printers, and the like.

Examples of this invention will be given in the following description.

EXAMPLES 1-7

An aqueous ammonia solution of casein (casein 11.2 g, 28% aqueous ammonia 1 g, water 222 ml) was coated on an aluminum plate by means of a Meyer bar and dried to form a bond layer of 1.0 g/m².

Disazo pigment A-(2) (5 g) was dispersed in a solution of a butyral resin (2 g, degree of butyral conversion 63 mole %) in 95 ml of ethanol. The resulting dispersion was coated on said bond layer and dried to form a charge generation layer of 0.2 g/m².

Hydrazone compound B-(3) (5 g) and a polycarbonate of bisphenol A (5 g; viscosity average mol. wt. about 30,000), dissolved in 150 ml of dichloromethane, were coated on said charge generation layer and dried to form a charge transport layer of 10 g/m². Thus, an electrophotographic photosensitive member was prepared.

Further 6 kinds of electrophotographic photosensitive members were prepared in the same manner except for using hydrazone compounds B-(4), B-(7), B-(8), B-(10), B-(12), and B-(14), separately, in place of the above hydrazone compound B-(3).

Each photosensitive member thus prepared was corona-charged at ⊖ 5 KV in the static fashion using an electrostatic copying paper testing machine (Model SP-428 supplied by Kawaguchi Denki K.K.), and after retained for 10 seconds in dark, was exposed to light at an intensity of 5 lux to examine its charge bearing characteristics.

The results are shown in Table 1, wherein Vo is the initial potential (−V), Rv is the percentage retention of the initial potential after 10-second standing in the dark, and E 1/10 is the quantity of exposure (lux.sec) for decaying the potential to 1/10 of the initial value.

TABLE 1

| Example No. | Hydrazone compound No. | Vo (−V) | RV (%) | E 1/10 (lux. sec) |
|---|---|---|---|---|
| 1 | B - (3)  | 530 | 95 | 10.8 |
| 2 | B - (4)  | 520 | 94 | 10.6 |
| 3 | B - (7)  | 520 | 93 | 11.0 |
| 4 | B - (8)  | 500 | 90 | 11.2 |
| 5 | B - (10) | 510 | 90 | 10.7 |
| 6 | B - (12) | 510 | 90 | 10.9 |
| 7 | B - (14) | 550 | 93 | 11.4 |

Photomemory tendencies ($P_M$) of sample photosensitive members were evaluated by measuring times in the dark for recovering the original charge bearing characteristics after 15-second standing of the charged members under ambient light of intensity about 800 lux. The results are shown in Table 2.

TABLE 2

| Example No. | $P_M$ (photomemory tendency) (min) |
|---|---|
| 1 | 2 |
| 2 | 2 |
| 3 | 4 |
| 4 | 3 |
| 5 | 4 |
| 6 | 4 |
| 7 | 3 |

EXAMPLES 8-17

A poly(vinyl alcohol) aqueous solution was coated on the aluminum surface of aluminum-metallized poly(ethylene terephthate) film and dried to form a bond layer of 2 g/m².

A pigment (5 g) shown in Table 3, dispersed in a mixture of 10 g of a polyester resin solution (solid content 20%; registered trade mark: Polyester Adhesive 49,000, mfd. by DuPont de Nemours & Co.) and 80 ml of tetrahydrofuran, was coated on said bond layer and dried to form a charge generation layer of 0.20 g/m².

Hydrazone compound B-(3) (5 g; used also in Example 1) and a poly(methyl methacrylate) resin (5 g; viscosity average mol. wt. about 50,000) were dissolved in 70 ml of tetrahydrofuran and coated on said charge generation layer to form a charge transport layer of 10 g/m² after drying.

In this way, 10 kinds of electrophotographic photosensitive members were prepared which have each different disazo pigment in the charge generation layer. Results of the same tests as Examples 1-7, conducted on these photosensitive members are shown in Table 3.

TABLE 3

| Example No. | Disazo pigment | Vo (−V) | RV (%) | E 1/10 (lux. sec) | $P_M$ (min) |
|---|---|---|---|---|---|
| 8  | A - (9)  | 500 | 90 | 10.2 | 2 |
| 9  | A - (7)  | 530 | 93 | 10.6 | 2 |
| 10 | A - (8)  | 550 | 94 | 10.8 | 2 |
| 11 | A - (4)  | 520 | 91 | 10.4 | 2 |
| 12 | A - (12) | 510 | 91 | 10.2 | 3 |
| 13 | A - (13) | 530 | 92 | 9.8  | 3 |
| 14 | A - (14) | 500 | 90 | 10.2 | 4 |
| 15 | A - (25) | 480 | 91 | 10.9 | 3 |
| 16 | A - (26) | 470 | 89 | 10.4 | 2 |
| 17 | A - (27) | 490 | 90 | 11.3 | 4 |

COMPARATIVE EXAMPLES 1-4

Electrophotographic photosensitive members were prepared, for comparison, in the same manner as Examples 1-7, except that the pigments, shown in the remarks of Table 4, which are not included in the scope of this invention, were used separately in place of disazo pigments of this invention.

Table 4 also shows results of the same tests as Examples 1-7 for charge bearing characteristics conducted on these comparative samples 1∼4.

TABLE 4

| Comparative Example No. | Comparative pigment | Vo (−V) | Rv (%) | E1/10 (lux. sec) | $P_M$ (min) |
|---|---|---|---|---|---|
| 1 | (A) | 420 | 82 | 50.1 | 40 |
| 2 | (B) | 400 | 83 | 62.7 | 40 |
| 3 | (C) | 360 | 81 | 65.6 | 30 |

TABLE 4-continued

| Comparative Example No. | Comparative pigment | Vo (−V) | Rv (%) | E1/10 (lux. sec) | $P_M$ (min) |
|---|---|---|---|---|---|
| 4 | (D) | 380 | 82 | 66.7 | 40 |

Remarks:
Comparative pigments (A)–(D) are as follows:

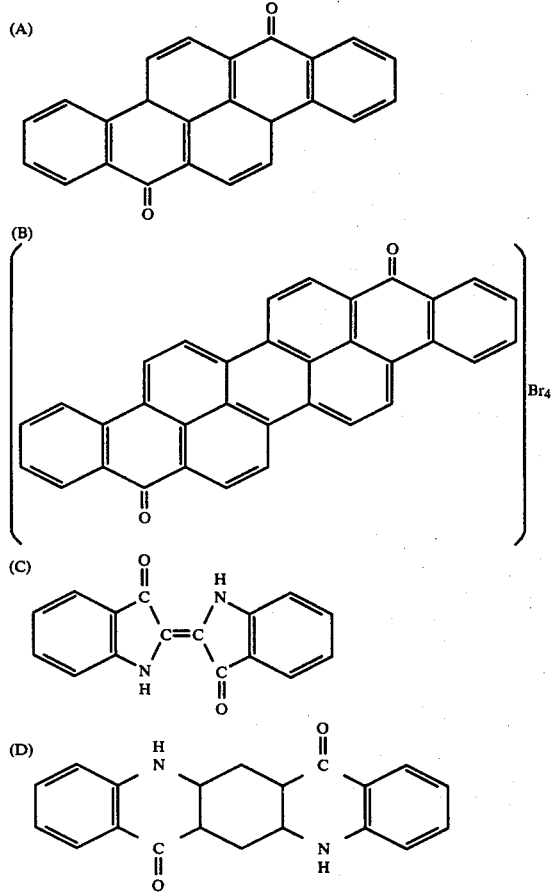

EXAMPLES 18–21

The same bond layer and charge generation layer as Example 10 were successively formed on the aluminum-metallized surface of poly(ethylene terephthalate) film.

A hydrazone compound (5 g) and the same polycarbonate of bisphenol A (5 g) as used in Examples 1–7 were dissolved in 150 ml of monochlorobenzene, coated on said charge generation layer, and dried to form a charge transport layer of 12 g/m².

In this way, four kinds of electrophotographic photosensitive members were prepared using hydrazone compounds B-(20), B-(25), B-(27), and B-(36), separately for said charge transport layer formation. Table 5 shows results of the same tests for charge bearing characteristics of these photosensitive members as Examples 1–7.

TABLE 5

| Example No. | Hydrazone compd. | Vo (−V) | Rv (%) | E1/10 (lux. sec) | $P_M$ (min) |
|---|---|---|---|---|---|
| 18 | B-(20) | 540 | 92 | 10.7 | 2 |
| 19 | B-(25) | 520 | 91 | 11.2 | 4 |
| 20 | B-(27) | 540 | 93 | 10.9 | 3 |
| 21 | B-(36) | 550 | 92 | 10.6 | 2 |

As is evident from Examples 1–21 and comparative Examples 1–4, electrophotographic photosensitive members combining a specific disazo pigment and a specific hydrazone compound of this invention are superior in sensitivity and durability to those having other combinations of charge-generating material and charge-transporting material.

What we claim is:

1. An electrophotographic photosensitive member characterized by comprising a charge generation layer containing at least one disazo pigment represented by the following formula [I] and a charge transport layer containing at least one hydrazone compound represented by the following formula [II]:

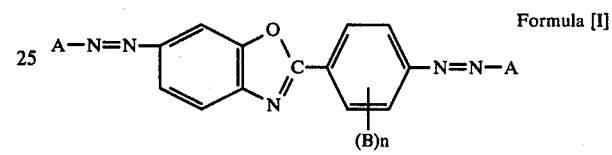

Formula [I]

wherein A is a coupler residue, B represents hydrogen, halogen, alkyl, or alkoxy, and n is an integer of 1 to 4;

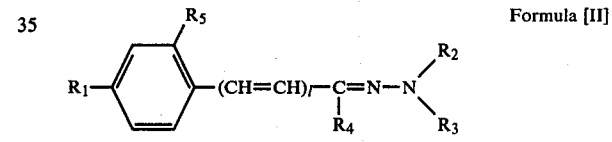

Formula [II]

wherein $R_1$ represents N,N-dialkylamino, or N,N-diarylamino, or N-alkyl-N-arylamino, or alkoxy or aryloxy, each being substituted or unsubstituted; $R_2$ and $R_3$ each represent alkyl, aralkyl, or aryl, each being substituted or unsubstituted, or $R_2$ and $R_3$, together with the nitrogen atom which links them, represent nitrogen-containing heterocyclic ring; $R_4$ represents hydrogen, or alkyl, aralkyl, or aryl, each being substituted or unsubstituted; $R_5$ represents hydrogen, alkyl, or alkoxy; and l is 0 or 1.

2. An electrophotographic photosensitive member of claim 1, wherein A in the formula [I] is a coupler residue represented by the following formula (a), (b), (c), or (d):

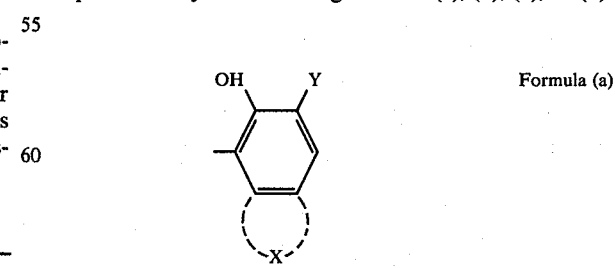

Formula (a)

wherein X represents a group necessary to complete an aromatic hydrocarbon ring or a heterocyclic ring, each being substituted or unsubstituted; and Y represents

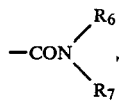

wherein $R_6$ represents hydrogen, or alkyl or aryl, each being substituted or unsubstituted, and $R_7$ represents alkyl or aryl, each being substituted or unsubstituted;

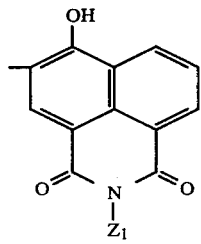

Formula (b)

wherein $Z_1$ represents alkyl, aralkyl, or aryl, each being substituted or unsubstituted;

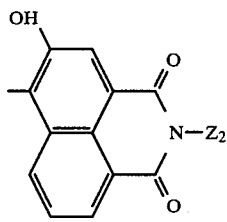

Formula (c)

wherein $Z_2$ represents alkyl, aralkyl, or aryl, each being substituted or unsubstituted; and

Formula (d)

3. An electrophotographic photosensitive member of claim 2, wherein A in the formula [I] is a coupler residue represented by the formula

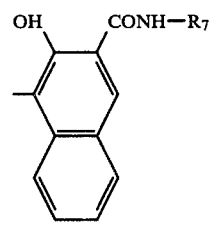

wherein $R_7$ represents alkyl or aryl, each being substituted or unsubstituted.

4. An electrophotographic photosensitive member of claim 1, wherein $R_1$ in the formula [II] is N,N-dialkylamino, or N,N-diarylamino, or N-alkyl-N-arylamino, each being substituted or unsubstituted.

5. An electrophotographic photosensitive member of claim 4, wherein $R_1$ in the formula [II] is dimethylamino, diethylamino, dipropylamino, dibutylamino, dibenzylamino, or diphenylamino.

6. An electrophotographic photosensitive member of claim 1, wherein $R_2$ and $R_3$ in the formula [II] are each substituted or unsubstituted aryl.

7. An electrophotographic photosensitive member of claim 5, wherein at least one of $R_2$ and $R_3$ in the formula [II] is α-naphthyl or β-naphtyl.

* * * * *

UNITED STATES PATENT AND TRADEMARK OFFICE
CERTIFICATE OF CORRECTION

PATENT NO. : 4,413,045

DATED : November 1, 1983

INVENTOR(S) : ISHIKAWA, ET AL.

It is certified that error appears in the above-identified patent and that said Letters Patent is hereby corrected as shown below:

Col. 2, lines 61-65, Formula (I),

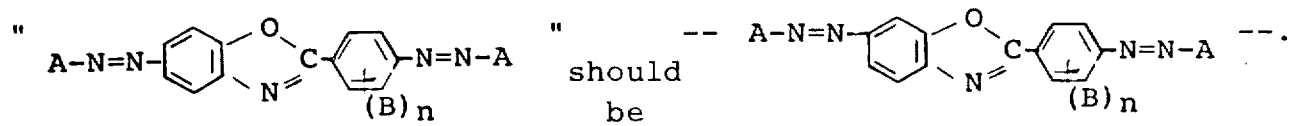

Cols. 7 and 8, Figure A -(4),

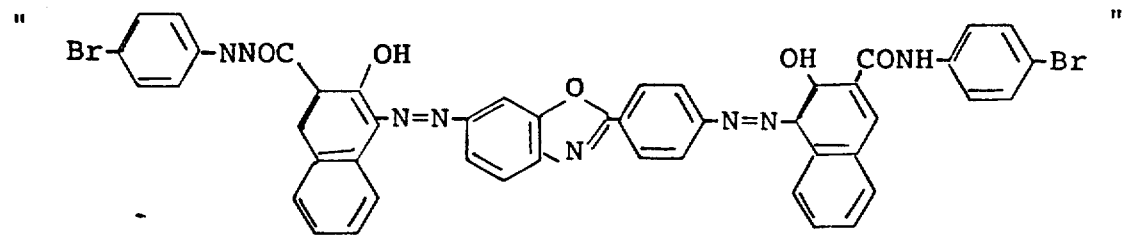

should be

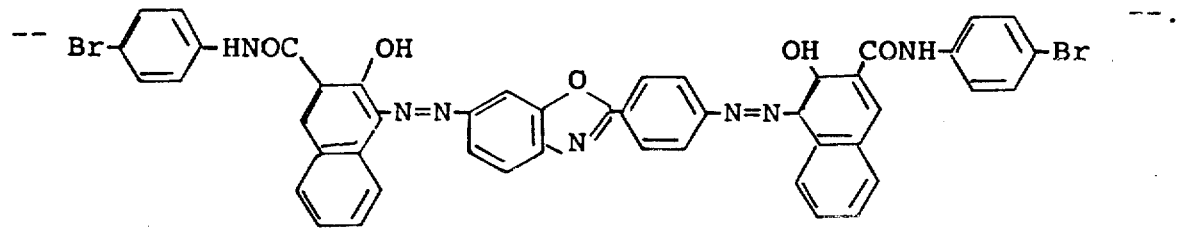

UNITED STATES PATENT AND TRADEMARK OFFICE
CERTIFICATE OF CORRECTION

PATENT NO. : 4,413,045

DATED : November 1, 1983

INVENTOR(S) : ISHIKAWA, ET AL.

It is certified that error appears in the above-identified patent and that said Letters Patent is hereby corrected as shown below:

Cols. 13 and 14, Figure A - (17),

"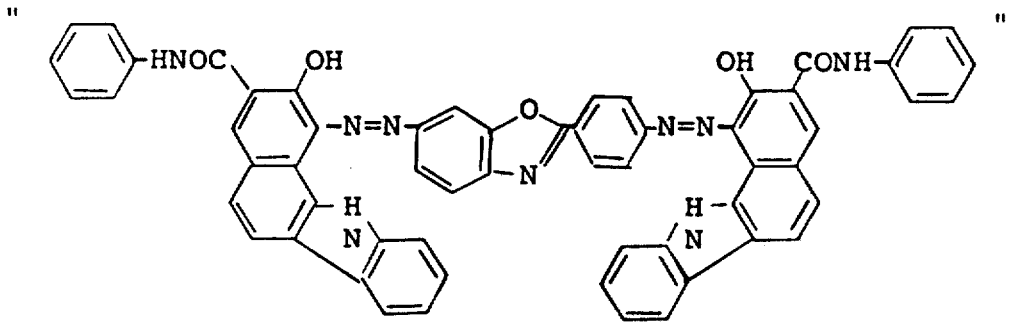"

should be

--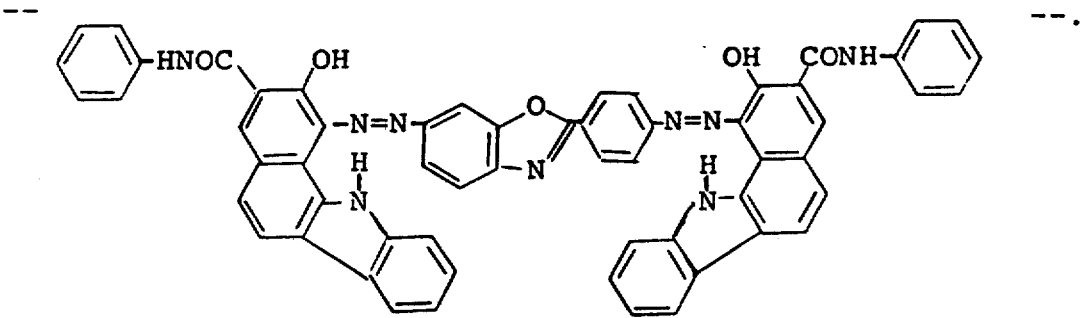--.

UNITED STATES PATENT AND TRADEMARK OFFICE
CERTIFICATE OF CORRECTION

PATENT NO. : 4,413,045

DATED : November 1, 1983

INVENTOR(S) : ISHIKAWA, ET AL.

It is certified that error appears in the above-identified patent and that said Letters Patent is hereby corrected as shown below:

Col. 17, line 35, Figure B-(2),

"
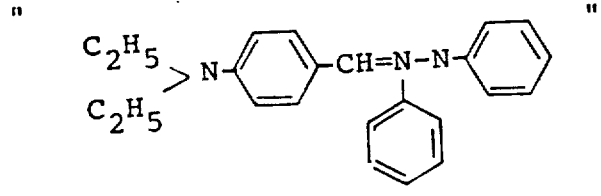
"

should be

--
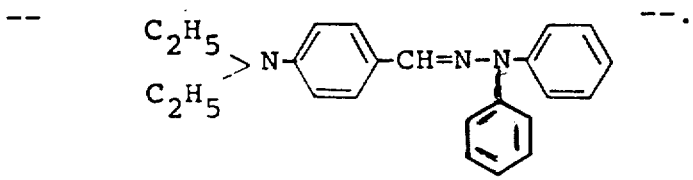
--.

Signed and Sealed this

Thirty-first Day of July 1984

[SEAL]

Attest:

GERALD J. MOSSINGHOFF

Attesting Officer     Commissioner of Patents and Trademarks